US011244518B2

(12) United States Patent
Grenfell et al.

(10) Patent No.: US 11,244,518 B2
(45) Date of Patent: **\*Feb. 8, 2022**

(54) DIGITAL STAGES FOR PRESENTING DIGITAL THREE-DIMENSIONAL MODELS

(71) Applicant: Adobe Inc., San Jose, CA (US)

(72) Inventors: Desmond Thomas Grenfell, Lancashire (GB); Herbert Wolfram, San Rafael, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/886,077

(22) Filed: May 28, 2020

(65) Prior Publication Data

US 2020/0294321 A1 Sep. 17, 2020

Related U.S. Application Data

(63) Continuation of application No. 15/890,097, filed on Feb. 6, 2018, now Pat. No. 10,740,981.

(51) Int. Cl.
*G06T 19/20* (2011.01)
(52) U.S. Cl.
CPC .......... *G06T 19/20* (2013.01); *G06T 2200/24* (2013.01); *G06T 2219/2004* (2013.01)
(58) Field of Classification Search
CPC ......... G06T 15/00–87; G06T 19/00–20; G06T 2219/2004; G06T 2200/24; G06T 19/20
See application file for complete search history.

(56) References Cited

U.S. PATENT DOCUMENTS

| 5,977,978 A | 11/1999 | Carey et al. |
| 6,084,590 A | 7/2000 | Robotham et al. |
| 10,740,981 B2 | 8/2020 | Grenfell et al. |

(Continued)

OTHER PUBLICATIONS

NPL Video titled "3D Warehouse: Searching and Downloading", published Nov. 18, 2015; https://www.youtube.com/watch?v=KfQ11kcLM5k; select screenshots included. (Year: 2015).*
NPL Video titled "Sketchup and Google 3D Warehouse Tutorial", published Mar. 1, 2008; https://www.youtube.com/watch?v=GTDoLfECkgU; select screenshots included. (Year: 2008).*
Merrell, Paul, et al. "Interactive furniture layout using interior design guidelines." ACM transactions on graphics (TOG) 30.4 (2011): 1-10. (Year: 2011).*

(Continued)

*Primary Examiner* — Daniel F Hajnik
(74) *Attorney, Agent, or Firm* — FIG. 1 Patents

(57) ABSTRACT

Digital stages for presenting digital three-dimensional (3D) models are described. A service provider system, such as a content creation service provider system, supports generation of digital content based on incorporation of digital 3D models of objects into digital 3D environments. In particular, this model incorporation and digital content generation is supported by configuring 3D environments as "stages," which are implemented using data that describes characteristics of the digital 3D stages (e.g., background imagery, environment geometry, lighting, stage cameras, and so forth) according to a schema. Due to such configuration, the service provider can expose digital 3D stages for selection, incorporate digital 3D models at predefined positions within selected stages, and present views of incorporated models via the stages from predefined cameras. The service provider system thus enables client device users to simply select predefined positions and cameras, rather enter code to program 3D environments for presenting 3D objects.

20 Claims, 11 Drawing Sheets

(56) References Cited

U.S. PATENT DOCUMENTS

| | | | |
|---|---|---|---|
| 2008/0112610 A1* | 5/2008 | Israelsen | G06T 17/00 |
| | | | 382/154 |
| 2009/0138113 A1* | 5/2009 | Hoguet | G06F 30/13 |
| | | | 700/98 |
| 2009/0262107 A1 | 10/2009 | Castelli | |
| 2013/0215116 A1 | 8/2013 | Siddique et al. | |
| 2014/0087877 A1 | 3/2014 | Krishnan | |
| 2016/0048908 A1* | 2/2016 | Sibai | G06Q 30/0643 |
| | | | 705/14.1 |
| 2016/0350980 A1* | 12/2016 | Hu | G06T 19/20 |
| 2017/0337573 A1* | 11/2017 | Toprak | G07C 5/006 |
| 2018/0114264 A1* | 4/2018 | Rafii | G06Q 30/0643 |
| 2018/0205940 A1 | 7/2018 | Donovan | |
| 2019/0244435 A1 | 8/2019 | Grenfell et al. | |

OTHER PUBLICATIONS

"3D Warehouse: Searching and Downloading", Retrieved at https://www.youtube.com/watch?v=KfQ11kcLM5k, Nov. 18, 2015, 1 page.
"Final Office Action", U.S. Appl. No. 15/890,097, filed Feb. 19, 2020, 21 pages.
"Final Office Action", U.S. Appl. No. 15/890,097, filed Jul. 10, 2019, 20 pages.
"Non-Final Office Action", U.S. Appl. No. 15/890,097, filed Sep. 19, 2019, 21 pages.
"Notice of Allowance", U.S. Appl. No. 15/890,097, filed Mar. 31, 2020, 11 pages.
"Pre-Interview First Office Action", U.S. Appl. No. 15/890,097, filed Apr. 29, 2019, 4 pages.
"Sketchup and Google 3D Warehouse Tutorial", Retrieved at https://www.youtube.com/watch?v=GTDoLfECkgU, Mar. 1, 2008, 1 page.

* cited by examiner

DIGITAL STAGES FOR PRESENTING DIGITAL THREE-DIMENSIONAL MODELS

RELATED APPLICATION

This application is a continuation of and claims priority to U.S. patent application Ser. No. 15/890,097, filed Feb. 6, 2018, which is incorporated by reference herein in its entirety.

BACKGROUND

Service provider systems continue to make advances in computing technologies to enable creation of digital content for various purposes. By way of example, these advances enable client device users to interact with the service provider systems to create digital content that conveys information about products and services offered for sale, such as digital images that depict products in relevant environments. A digital image depicting a car, for instance, may depict the car in some environment intended to invoke a particular response in viewers of the digital image, e.g., a desire to drive the depicted car in the depicted environment. These advances in computing technologies enable service provider systems to support creation of such digital images, in part, by constructing digital three-dimensional (3D) scenes that include objects, such as vehicles, devices, clothing, structures, and so forth.

However, conventional systems for constructing these digital 3D scenes require client device users interfacing with these systems to direct construction of the scenes by entering code to program characteristics of the scenes, such as lighting, reflection of particular surfaces in the scene, and so forth. Due to this, conventional systems limit the use of modeling with 3D scenes to client device users with knowledge of programming 3D scenes. Many client device users do not have programming knowledge and programming can be difficult to learn. As a result, systems for constructing digital 3D scenes with various objects are not used in many scenarios where presentation via such scenes may be desirable.

SUMMARY

To overcome these problems, digital stages for presenting digital three-dimensional (3D) models are leveraged. A service provider system, such as a content creation service provider system, supports generation of digital content based on incorporation of digital 3D models of objects into digital 3D environments. In particular, the model incorporation and digital content generation is supported by configuring 3D environments as "stages," which are implemented using data that describes characteristics of the digital 3D stage (e.g., background imagery, environment geometry, lighting, stage cameras, and so forth) according to a schema. The service provider defines the schema as a set of rules for controlling configurations of the data to implement digital 3D stages. By controlling these configurations, the service provider is able to expose the digital 3D stages for selection by client device users, incorporate digital 3D models at predefined positions within the stages, and present views of the incorporated models within the stages from predefined cameras. The service provider system thus enables client device users to simply select a predefined position and camera, rather than enter code to program a 3D environment for presenting a 3D object. This makes 3D model presentation via 3D environments accessible to client device users without knowledge of how to program 3D environments.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
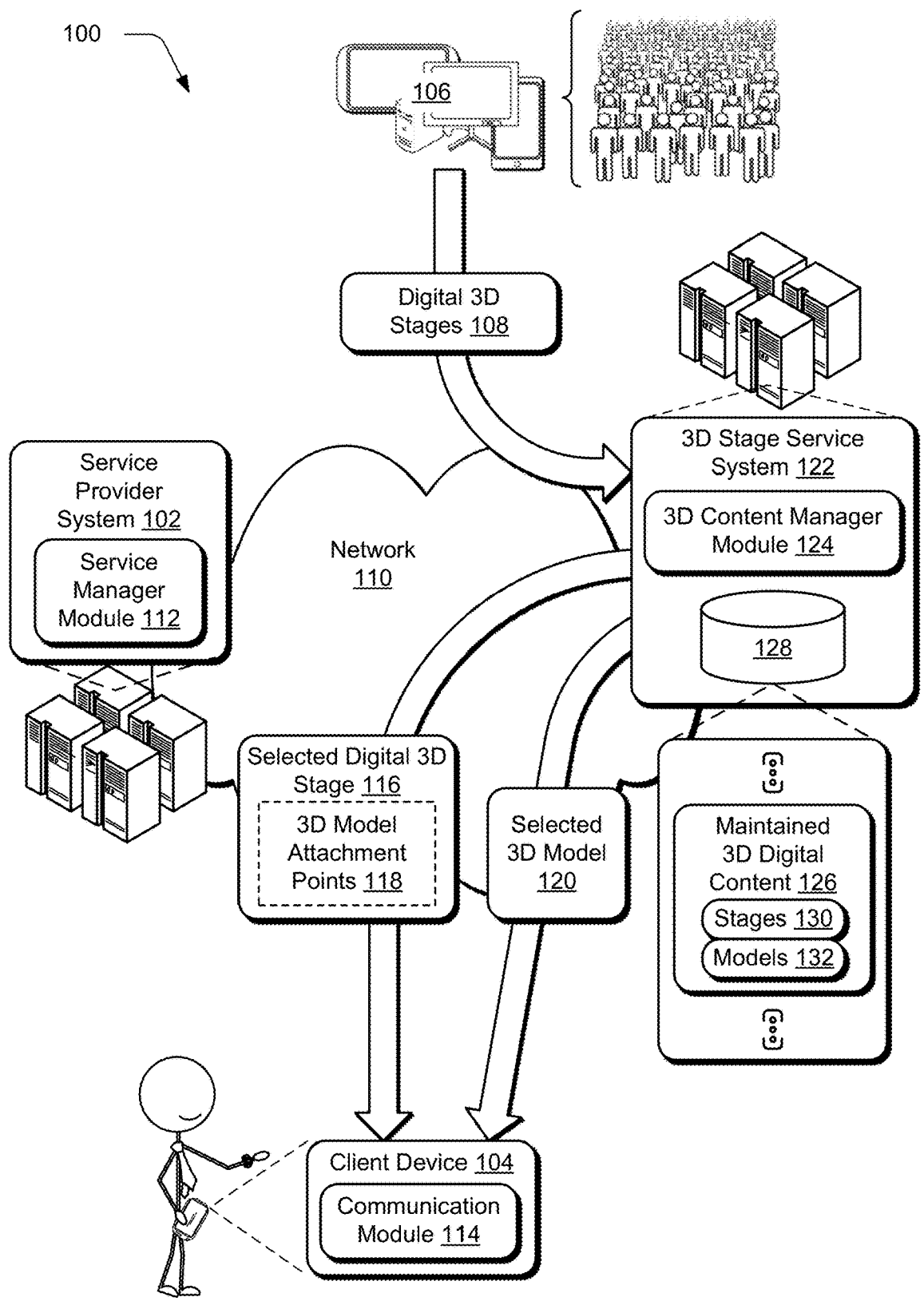
FIG. 1 is an illustration of an environment in an example implementation that is operable to employ techniques described herein.

Service provider systems continue to make advances in computing technologies to enable creation of digital content for various purposes. These advances enable service provider systems to support creation of digital visual content depicting different objects in different environments. In some scenarios, creation of such content involves leveraging functionality of the service provider system to construct digital three-dimensional (3D) scenes to include objects, such as vehicles, devices, clothing, structures, and so forth.

However, conventional systems for constructing these digital 3D scenes require client device users that interface with these systems to direct construction of the scenes by entering code to program characteristics of the scenes, such as lighting, reflection of particular surfaces in the scene, and so forth. Since, many client device users do not have programming knowledge and programming can be difficult to learn, conventional systems for constructing digital 3D scenes with various objects are not used in many scenarios where presentation via such scenes may be desirable.

To overcome these problems, digital stages for presenting digital 3D models are leveraged. In one or more implementations, a service provider system, such as a content creation service provider system, supports generation of digital content based on incorporation of digital 3D models of objects into digital 3D environments. In particular, the model incorporation and digital content generation is supported by configuring 3D environments as "stages." Examples of these stages include a highway stage or auto-dealer showroom stage (e.g., for incorporating digital 3D models of cars), a living room stage (e.g., for incorporating digital 3D models of furniture), a hand stage or pocket stage (e.g., for incorporating digital 3D models of mobile devices), a mannequin or human stage (e.g., for incorporating digital 3D models of clothing and accessories).

In accordance with the following discussion, digital 3D stages are implemented using data that describes characteristics of a respective digital 3D stage (e.g., background imagery, environment geometry, lighting, stage cameras, and so forth) according to a schema. The service provider defines the schema as a set of rules for controlling configurations of the data to implement digital 3D stages. By configuring the data according to the schema, the service provider system is able to treat suitably configured 3D digital stages in known ways to achieve repeatable results, e.g., incorporation of a digital 3D model at an appropriate size within the stage and so that a presentation of the modeled object is visually pleasing. In other words, digital 3D stages reduce a difficulty of incorporating digital 3D models into digital 3D environments.

In particular, configuration according to the schema allows the service provider system to expose digital 3D stages to client devices for user selection. These client devices present representations of the digital 3D stages for user selection via a user interface, such as a user interface of a browser-based application. Responsive to selection of a digital 3D stage and a digital 3D model via the user interface, the schema-configured data of the selected 3D stage enables either the client device or the service provider system to incorporate the digital 3D model into the digital 3D stage. By way of example, the client device or service provider system incorporates the digital 3D model into the digital 3D stage at a position within the digital 3D stage that is defined by its data—the inclusion of such a defined position being one aspect of conforming to the schema. Further, the client device or service provider system presents the digital 3D model, as incorporated in the digital 3D stage, via a camera within the stage having a viewpoint that is defined by the stage's data—the inclusion of such a defined camera being another aspect of conforming to the schema.

As discussed in more detail below, the data of a digital 3D stage limits the modifications that an end user is allowed to make to characteristics of the stage and a digital 3D model incorporated therein. By way of example, a stage may limit the positions at which a digital 3D model can be incorporated. By limiting the modifications that end client device users are allowed to make and surfacing functionality for model incorporation via browser-based user interfaces, the service provider system supports a variety of advantages. For instance, the service provider system enables client device users to simply select a predefined position for incorporation of a digital 3D model rather than enter code to program a position for incorporating the digital 3D model. The service provider also enables client device users to select a predefined camera for presenting an incorporated digital 3D model rather than enter code to program a position of a camera or other characteristics of the camera. Indeed, the described system makes 3D model presentation via 3D environments accessible to more client device users than conventional techniques, e.g., client device users without knowledge of 3D-environment programming in addition to client device users having such knowledge.

Term Descriptions

A 3D stage "schema" refers to a set of rules for controlling data specified to describe a digital 3D stage. In particular, the 3D stage schema controls the information of digital 3D stages that is to be instantiated to incorporate digital 3D models within these stages and produce presentations of the digital 3D models as incorporated.

As used herein, a "digital 3D stage" refers to data configured according to a 3D stage schema and describing characteristics of an environment for presenting an incorporated digital 3D model. The data of a digital 3D stage also describes characteristics that affect presentation of such a model as incorporated. Examples of data included in a digital 3D stage include environment geometry data, lighting data, background imagery data, ground plane data, environment reflection data, stage camera data, model attachment point data, dimensional unit data, render setting data, and locked characteristic data.

As used herein, a "digital 3D model" refers to data that enables a corresponding object to be reproduced for visual presentation via a computing device. Examples of objects that can be modeled as digital 3D models include vehicles, computing devices (e.g., mobile devices, computing peripherals, etc.), clothing, furniture, structures (e.g., buildings, bridges, roadways, etc.), and so forth.

In the following discussion, an example environment that may employ the techniques herein is first described. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital stages for presenting three-dimensional (3D) models described herein. The illustrated environment 100 includes a service provider system 102, client device 104, and sources 106 of digital 3D stages 108, that are communicatively coupled, one to another, via a network 110.

Computing devices that are usable to implement the service provider system 102, client device 104, and sources 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of one device or a plurality of different devices, such as multiple servers utilized by a business to perform operations "over the cloud" as further described in relation to FIG. 11.

The service provider system 102 is illustrated as including a service manager module 112 that is representative of functionality to provide services accessible via the network 110. These services are usable to make products or services available to consumers. The service manager module 112, for instance, may expose a website or other functionality that is accessible via the network 110 by a communication module 114 of the client device 104. The communication module 114 may be configured in a variety of ways, e.g., it may be configured as a browser-based application, a network-enabled application, and so on that obtains data from the service provider system 102 via the network 110. This data is employed by the communication module 114 to enable a user of the client device 104 to communicate with the service provider system 102 to obtain information corresponding to the products or services, e.g., digital stages and 3D models when the service provider system 102 is a content creation service with tools that enable 3D-model presentation.

Selected digital 3D stage 116 is an example of data into which a 3D model of an object (e.g., a car, plane, bike, mobile computing device, clothing) can be incorporated for presentation. In general, the selected digital 3D stage 116 represents data having characteristics defined by a 3D stage schema and describing different aspects of an environment in which an incorporated 3D model is staged. For instance, the data describes background imagery, stage lighting, a ground plane, preset cameras via which incorporated 3D models and visual content of the environment can be viewed, environment audio, and so forth. The selected digital 3D stage 116 is depicted with 3D model attachment points 118, which represent one or more positions in the environment at which a 3D model can be incorporated, e.g., for presentation "on the stage." In this context, selected 3D model 120 represents data describing characteristics (e.g., structure, colors, reflectivity, and so on) that enable a respective object to be three-dimensionally rendered. In particular, the selected 3D model 120 is selected by a user of the client device 104, e.g., via a user interface for incorporation into a digital 3D stage. In accordance with the techniques described herein, the selected 3D model 120 can be incorporated into the selected digital 3D stage 116 at a 3D model attachment point 118 for presentation. The client device 104 further represents functionality to render digital content of the selected 3D model 120 as presented via the selected digital 3D stage 116, e.g., images, augmented and virtual reality content (AR/VR content), videos, and so forth.

In order to surface digital 3D stages and 3D models for selection by client device users, the service provider system 102 may employ the 3D stage service system 122. Although functionality of the 3D stage service system 122 is illustrated as separate from the service provider system 102, this functionality may also be incorporated as part of the service provider system 102, further divided among other entities, and so forth. The 3D stage service system 122 includes 3D content manager module 124 that is implemented at least partially in hardware of a computing device to provide digital 3D stages and models over the network 110 to the client device 104. The 3D stages and models provided can be identified from maintained 3D digital content 126, which is illustrated as stored in storage 128. The 3D stage service system 122 also represents functionality to impose rules according to which 3D stages are to be configured (e.g., a 3D stage schema) for provision to client devices.

In the illustrated environment, the maintained 3D digital content 126 includes stages 130 and models 132. These represent digital 3D stages and models maintained by the 3D stage service system 122 for provision to client devices, e.g., based on selection by users of the client devices. To this end, the selected digital 3D stage 116 and the selected 3D model 120 may correspond to one of the stages 130 and one of the models 132, respectively, selected by a user of the client device 104. In one or more implementations, the 3D stage service system 122 may expose a subset of the models 132 and the stages 130 for selection by the user of the client device 104. Consider an example in which the 3D stage service system 122 maintains stages and models for at least a first entity and a second entity (e.g., first and second companies) and in which the user of the client device 104 is associated with the first entity. In this scenario, the 3D stage service system 122 may expose to the user of the client device 104 the stages 130 and the models 132 corresponding to the first entity, and not the stages 130 and the models 132 corresponding to the second entity. Alternately or in addition, the 3D stage service system 122 may be configured as a stock service that provides stock stages and models. In this scenario, the 3D stage service system 122 may expose to the user of the client device 104 the stages 130 and the models 132 the user is allowed to access according to an agreement with the stock service, e.g., a subscription for receiving digital 3D stages and/or models.

In any case, the 3D stage service system 122 leverages functionality of the 3D content manager module 124 to obtain digital 3D stages 108 from the sources 106, obtain 3D models from the sources 106, generate other digital 3D stages automatically (e.g., based on obtained spherical images and/or videos), maintain digital 3D stages and models, expose digital 3D stages and models for selection by users of client devices, surface functionality that enables incorporation of selected digital 3D models into selected digital 3D stages, transmit selected digital 3D models and selected digital 3D stages over the network 110 to computing devices (e.g., the client device 104), render digital content (e.g., images, videos, AR/VR content) based on a digital 3D stage with an incorporated 3D model, and so forth.

In the context of the described environment 100, consider again the sources 106 of the digital 3D stages 108. These sources 106 may be associated with users that create the digital 3D stages 108. By way of example, a user may use a digital camera to capture imagery of a scene, e.g., a spherical high dynamic range (HDR) image, spherical HDR video, and so on. The user may then leverage one or more computing applications to generate a digital 3D stage from the captured digital imagery. This leveraging may include making selections via an interface or entering code to specify various characteristics of the scene, such as position and intensity of lighting (e.g., point lighting, directional lighting, area lighting, volume lighting, and so on), position and orientation of one or more cameras within the stage, a ground plane, one or more positions within the captured environment where a 3D model can be incorporated, and so forth.

In any case, the user may eventually select to communicate a created stage as the digital 3D stage 108 to the 3D stage service system 122. Users may do this as part of an entity (e.g., a company), so that the 3D stage service system 122 can expose a created digital 3D stage to client devices of other users associated with the entity. Alternately or in addition, users of the sources 106 may communicate created digital 3D stages to the 3D stage service system 122 for use as stock content. In one or more implementations, one or more of the sources 106 may correspond to users of a social networking service, such as a social networking service associated with content creation (e.g., Adobe® Behance).

Having considered an example environment, consider now a discussion of some example details of the techniques for digital stages for presenting digital 3D models in a digital medium environment in accordance with one or more implementations.

Digital Stages for Presenting 3D Models

Figure 2:
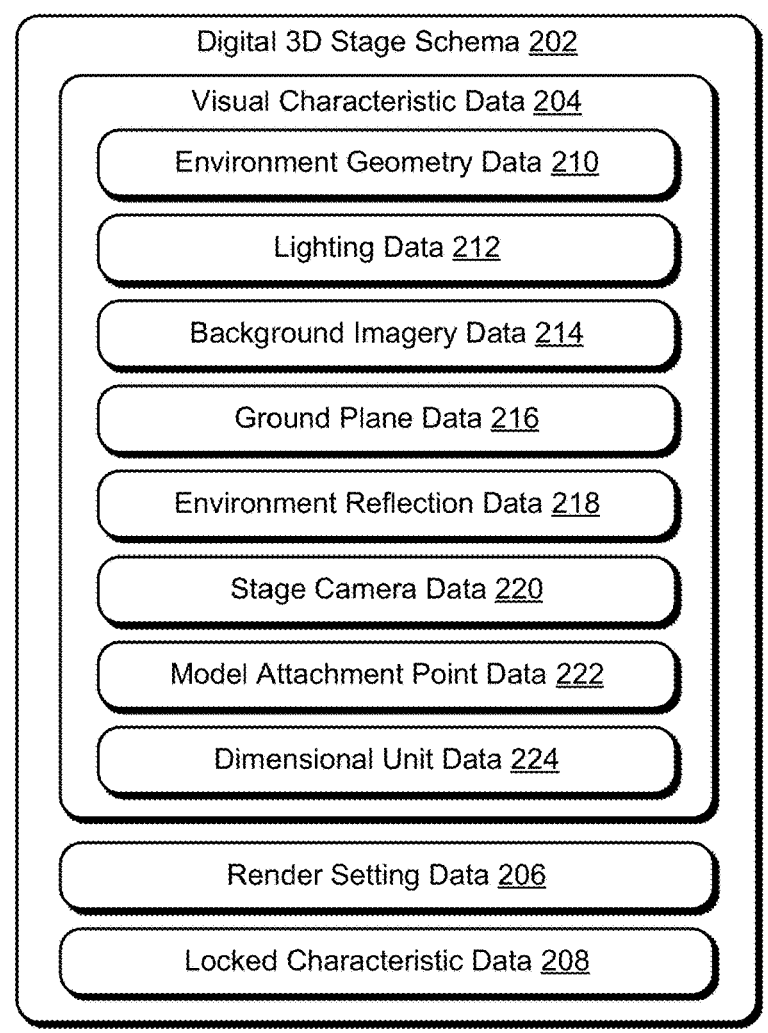
FIG. 2 depicts an example of a digital three-dimensional (3D) stage schema that is usable to implement data structures of digital 3D stages into which 3D models can be incorporated for presentation.

FIG. 2 depicts an example 200 of a digital three-dimensional (3D) stage schema that is usable to implement data structures of digital 3D stages into which 3D models can be incorporated for presentation. In particular, the illustrated example 200 includes digital 3D stage schema 202.

The digital 3D stage schema 202 represents a set of rules for controlling how data for implementing a digital 3D stage is to be configured. The digital 3D stage schema 202 standardizes digital 3D stages so that the data can be repeatedly processed in a known way to provide expected functionality. In one or more implementations, the 3D stage service system 122 defines this set of rules and provides the described functionality in relation to digital 3D stages generated based on and/or configured according to the digital 3D stage schema 202. By way of example, the 3D stage service system 122 may limit the digital 3D stages exposed for user selection to the stages 130 that are configured according to the digital 3D stage schema 202.

It is to be appreciated that the digital 3D stage schema 202 of the illustrated example 200 is merely one example implementation. Indeed, the digital 3D stage schema 202 may be defined in other ways without departing from the spirit or scope of the techniques described herein. Additionally, digital 3D stages that are embodied in data having different stage file types may be supported by the described techniques so long as such file types include at least the data indicated by an in-effect digital 3D stage schema, e.g., a digital 3D stage schema imposed by the 3D stage service system 122.

The digital 3D stage schema 202 serves as a basis for controlling a digital 3D stage's characteristics that are to be instantiated, and in some cases specifically limited, to enable incorporation of 3D models into the digital 3D stage. In the illustrated example 200, the digital 3D stage schema 202 includes visual characteristic data 204, render setting data 206, and locked characteristic data 208. Broadly speaking, these represent various data that a 3D digital stage conforming to the digital 3D stage schema 202 is to include. In this example, the visual characteristic data 204 is depicted having environment geometry data 210, lighting data 212, background imagery data 214, ground plane data 216, environment reflection data 218, stage camera data 220, model attachment point data 222, and dimensional unit data 224. Although the digital 3D stage schema 202 is discussed in relation to the illustrated data, digital 3D stage schemas leveraged in accordance with the described technique may specify different data without departing from the spirit or scope of those techniques.

The visual characteristic data 204 generally represents data for describing defined visual aspects of a stage's 3D environment in which a 3D model can be positioned. The environment geometry data 210, for instance, represents that a digital 3D stage configured according to the digital 3D stage schema 202 is to include data describing geometric aspects of this environment. By way of example, the environment geometry data 210 of a stage may describe structures that are part of the stage (e.g., buildings, walls, stairs, furniture, barriers, and so on), natural objects that are part of the stage (e.g., trees, bushes, rocks), topography of the stage, boundaries of the stage, and so forth. In one or more implementations, the environment geometry data 210 may be configured as a wireframe indicative of geometric aspects of the environment. Nevertheless, information about geometry of an environment may be conveyed as the environment geometry data 210 in other ways without departing from the spirit or scope of the techniques described herein.

The lighting data 212 represents that a digital 3D stage configured according to the digital 3D stage schema 202 is to include data describing stage lighting. The lighting data 212 describes one or more lights for lighting the 3D stage's environment and 3D models incorporated therein. By way of example, the lighting data 212 can be used to describe positions of lights of a 3D stage, a type of light (e.g., point lighting, directional lighting, area lighting, volume lighting, and so on), type-based characteristics of lights, lighting intensities, timing (e.g., for animating changes in the lighting), and so forth. In this way, the lighting data 212 is usable to describe localized lighting of the 3D stage, image-based lighting specified based on high dynamic range (HDR) imagery, lighting that changes based on video background imagery, and so forth. The lighting data 212 may describe aspects related to lighting a digital 3D stage in different ways without departing from the spirit or scope of the techniques described herein.

The background imagery data 214 represents that a digital 3D stage configured according to the digital 3D stage schema 202 is to include data describing digital imagery that corresponds to different positions in the 3D stage, such as to positions within a field of view of a defined stage camera. By way of example, the background imagery data 214 may correspond to one or more digital images (e.g., spherical images, images that can be combined to form a spherical image, etc.), one or more digital videos (e.g., spherical videos, videos that can be combined to form a spherical video), vector graphics (e.g., animated or still), and so forth. In one or more implementations, the background imagery data 214 may correspond to one or more texture maps. These texture maps may further be associated with the environment geometry data 210, such that the texture maps are "wrapped" around the environment's geometry as defined by the environment geometry data 210.

As noted above, the background imagery data 214 may correspond not only to images and still graphics, but also to videos and animated graphics. In scenarios where the background imagery data 214 corresponds to images and still graphics, objects depicted in the environment do not "move." For instance, a person depicted in background imagery configured as an image remains in a same position. In scenarios where the background imagery data 214 corresponds to videos and animated graphics, however, objects depicted in the environment do "move." Accordingly, a person depicted in background imagery configured as a video may move in various ways, e.g., walk, interact with other people, interact with other objects in the imagery, and so forth. The background imagery data 214 may indicate digital visual content that corresponds to different portions of a digital 3D stage in a variety of ways and may also be configured in a variety ways in accordance with the described techniques.

The ground plane data 216 represents that a digital 3D stage configured according to the digital 3D stage schema 202 is to include data describing a plane (e.g., a two dimensional (2D) plane) on which a 3D model is presented. Consider an example in which a digital 3D stage corresponds to a cityscape having a road lined with sidewalks and, beyond the sidewalks, buildings. In this example, the ground plane data 216 may define the road as a ground plane, such that a 3D model incorporated into the cityscape stage sits on the road for presentation. The ground plane data 216 may also be used to define a different ground plane in connection with this example, such as two feet above the road. Given this, a 3D model incorporated into the cityscape stage sits on a plane that is two feet above the road.

Indeed, the ground plane data 216 may be used to define ground planes at different heights in a y-direction. For instance, in a scenario where a digital 3D stage corresponds to a sky (e.g., to present 3D models of airplanes, helicopters, drones, and so forth), the ground plane data 216 may define the ground plane as a midpoint along a y-axis that defines a height of the stage—this way models may be staged in a middle of a sky stage. Defining the ground plane in relation to a midpoint of a y-axis may also be useful in connection with other types of stages, such as underwater stages, space stages, and so forth. It should also be appreciated that the ground plane may be defined in relation to other axes, such as the x-axis or z-axis. This may be useful in connection with stages corresponding to a wall. Such stages may be used to present 3D models of objects that are often attached to or present on walls, e.g., thermostats, clocks, artwork, bugs, magnets, and so forth. The ground plane data 216 may indicate one or more ground planes for the corresponding digital 3D stage in a variety of ways without departing from the spirit or scope of the techniques described herein.

The environment reflection data 218 represents that a digital 3D stage configured according to the digital 3D stage schema 202 is to include data describing aspects of the surrounding environment that are to be seen as reflections within reflective surfaces of the digital 3D model. The sharpness, color, and intensity of these reflections will be determined by the reflective characteristics of the surfaces of the 3D model in which they are reflected. In one or more implementations, the environment reflection data 218 may not fully accord with the environment geometry and may be described in the environment reflection data 218 entirely for aesthetic purposes.

The stage camera data 220 represents that a digital 3D stage configured according to the digital 3D stage schema 202 is to include data describing cameras via which visual content of the 3D stage can be viewed. The stage camera data 220 describes one or more cameras for viewing the 3D stage and 3D models incorporated therein. Views of the 3D stage are limited to those that can be provided via cameras defined for the stage. By way of example, the stage camera data 220 can be used to describe positions of cameras in the stage, orientations of the cameras, allowable movement of the cameras (e.g., whether a camera is allowed to swivel in x- and y-directions, bounds on an amount the camera is allowed to swivel in different directions, whether a camera itself is allowed move through the stage—in any of the six degrees of freedom, and so on), field of view of the cameras, focal points of the cameras, photo-capturing characteristics of the cameras (e.g., exposure, white-balance, etc.), timing (e.g., for animating changes in camera position through a stage), and so forth. The stage camera data 220 may describe aspects related to viewing portions of a digital 3D stage and 3D models incorporated therein in different ways without departing from the spirit or scope of the described techniques.

The model attachment point data 222 represents that a digital 3D stage configured according to the digital 3D stage schema 202 is to include data describing positions within the 3D stage at which a 3D model can be incorporated. The model attachment point data 222 describes one or more positions in the 3D stage where 3D models, described by data separate from the digital 3D stage's data, can be incorporated. The model attachment point data 222 may enable incorporation of one 3D model, e.g., at one of the different attachment points at a time. Alternately or in addition, the model attachment point data 222 may enable incorporation of multiple 3D models, e.g., all the models at one of the different attachment points, different models at different attachment points, and so on. The model attachment point data 222 may describe different aspects related to positions in the 3D stage for incorporating 3D models without departing from the spirit or scope of the described techniques.

The dimensional unit data 224 represents that a digital 3D stage configured according to the digital 3D stage schema 202 is to include data describing a size of objects in the 3D stage, such as objects that are part of the stage and background imagery. The dimensional unit data 224 describes size in a way that enables models specified in different units to be automatically scaled to "fit" a size of the stage. The dimensional unit data 224 may be configured in a variety of ways in accordance with the described techniques.

The render setting data 206 represents that a digital 3D stage configured according to the digital 3D stage schema 202 is to include data describing different settings for rendering digital content produced from the digital 3D stage. The render setting data 206 describes various characteristics of digital content that can be rendered based on the digital 3D stage. Examples of the various characteristics include lists of applications capable of rendering digital content (e.g., images, videos, AR/VR content) of a digital 3D stage with an incorporated 3D model, attributes of the digital content that can be rendered (e.g., height and width in pixels, frame rate, etc.), and so forth.

The render setting data 206 also represents data to facilitate interfacing with third-party rendering systems, though such data may be incorporated elsewhere in the digital 3D stage schema 202 in one or more implementations. Broadly speaking, it can be difficult for inexperienced or casual users (e.g., marketers as compared to 3D stage developers) to use conventionally configured rendering systems to obtain realistic or otherwise satisfying rendered digital content. In contrast, the digital 3D stages described herein interface with the third-party rendering systems to assist such users to obtain professional rendered digital content with those third-party rendering systems. In one or more implementations, the render setting data 206 is associated with nodes of a render tree. The render setting data 206 may be configured as metadata of a digital 3D stage. The render setting data 206 may also be configured in different ways without departing from the spirit or scope of the techniques described herein.

The locked characteristic data 208 represents that a digital 3D stage configured according to the digital 3D stage schema 202 is to include data describing limits to modifications end client device users can make to characteristics of the digital 3D stage. These limits can be effective to provide end users (e.g., marketers) with a smaller number of options in relation to presenting a 3D object in a digital 3D stage than are available to 3D stage developers. By way of example, the locked characteristic data 208 may limit an end user to using solely the cameras defined by the stage camera data 220—an end user may be prevented from adding new cameras based on the locked characteristic data 208. Further examples of characteristics that the locked characteristic data 208 may limit include attachment points to those defined by the model attachment point data 222, lighting to that defined by the lighting data 212, and so forth. Although such characteristics may be modified in a number of ways by a 3D stage developer, the locked characteristic data 208 represents functionality that prevents client device users that receive a selected stage from modifying these characteristics in a same manner as 3D stage developers. Instead, the locked characteristic data 208 is effective to enable client device users that receive a selected stage to modify solely predefined characteristics (e.g., defined cameras, defined attachment points) in predefined ways (e.g., change an angle of a camera within an allowable predefined range). The locked characteristic data 208 may limit modifications that end users can make to digital 3D stages in various ways without departing from the spirit or scope of the techniques described herein.

Figure 3:
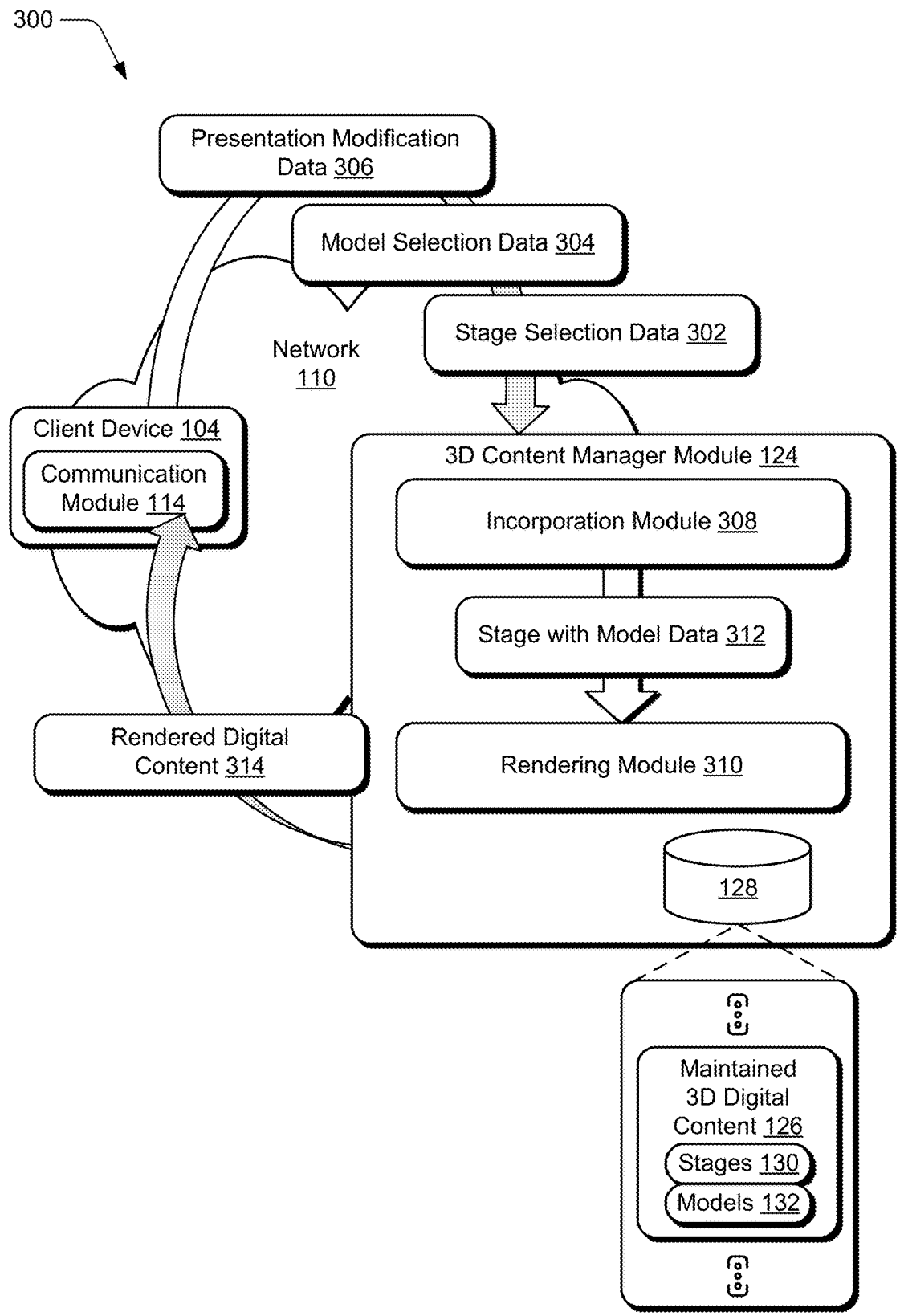
FIG. 3 depicts an example implementation in which a 3D stage service system of FIG. 1 exposes digital 3D stages and digital 3D models for selection by a client device user to present a selected model via a selected stage.

FIG. 3 depicts an example implementation 300 in which a 3D stage service system of FIG. 1 exposes digital 3D stages and digital 3D models for selection by a client device user to present a selected model via a selected stage.

The illustrated example 300 includes from FIG. 1 the client device 104 and the 3D content manager module 124. The 3D content manager module 124 is depicted obtaining stage selection data 302, model selection data 304, and presentation modification data 306 from the client device 104. Broadly speaking, the 3D content manager module 124 surfaces at least some of the stages 130 and the models 132 to the client device 104 for user selection. In one or more implementations, the communication module 114 is configured as a browser or part of a browser and the surfaced stages 130 and models 132 are presented for user selection via a user interface of the browser, as further described in relation to FIGS. 4 and 5.

Regardless of how the stages 130 and the models 132 are exposed for selection, the stage selection data 302 and the model selection data 304 represent selections made by a user of the client device 104 of one or more particular stages 130 and one or more particular models 132. In one or more implementations, the 3D content manager module 124 may simply transmit to the client device 104 the stages 130 indicated by the stage selection data 302 and the models 132 indicated by the model selection data 304, e.g., as the selected digital 3D stage 116 and the selected 3D model 120. In these scenarios, a user of the client device 104 may provide input via a user interface so that the client device 104 modifies the obtained model and stage locally. Further, the client device 104 generates digital content to present the model as incorporated into the stage. Alternately or in addition, the 3D content manager module 124 modifies the selected model and stage, generates digital content to present the model as incorporated, and transmits the generated digital content to the client device 104. In this second type of scenario, the 3D content manager module 124 may not transmit the selected model and stage over the network 110 to the client device 104. Here, the 3D content manager module 124 modifies the model and stage based on the presentation modification data 306.

In general, the presentation modification data 306 represents instructions, which may be received by the client device 104 via a user interface, e.g., a browser user interface. Once embodied in the presentation modification data 306, these instructions can instruct the 3D content manager module 124 to modify a 3D model incorporated within a digital 3D stage, e.g., by rotating the model, positioning the model in relation to an attachment point, and so on. These instructions can also instruct the 3D content manager module 124 to modify characteristics of the digital 3D stage that relate to presentation of an incorporated model, e.g., by selecting a camera to use in connection with rendering digital content, modifying characteristics of the stage's lighting, selecting a type of digital content to output such as an image or a video, and so forth.

In the illustrated example 300, the 3D content manager module 124 is depicted having incorporation module 308 and rendering module 310. The incorporation module 308 represents functionality to incorporate a selected 3D model in a selected digital 3D stage. By way of example, the incorporation module 308 incorporates a selected 3D model into a selected digital 3D model at a selected model attachment point, as indicated by the presentation modification data 306. The incorporation module 308 also represents functionality of the 3D content manager module 124 to carry out modifications of a 3D model and stage. Based on incorporation of a 3D model in a 3D stage as well as modification of the 3D model and/or 3D stage, the incorporation module 308 generates stage with model data 312. The stage with model data 312 describes how a client device user has selected to incorporate at least one 3D model into a 3D stage as well as modifications made to the incorporated model and stage. Additionally, the stage with model data 312 represents renderable data.

The rendering module 310 represents functionality of the 3D content manager module 124 to render digital content indicative of a digital 3D stage with an incorporated 3D model, e.g., the stage with model data 312. By way of example, the rendering module 310 renders digital content, including images, videos, and AR/VR content. The rendering module 310 renders this digital content based, at least in part, on the render setting data 206. Rendered digital content 314 represents the digital content rendered by the rendering module 310, e.g., rendered images, rendered videos, rendered AR/VR content, and so forth. When output using functionality of the client device 104, for instance, the rendered digital content 314 presents the selected 3D stage with selected 3D models in a manner specified by a user of the client device 104.

The client device 104 may output the rendered digital content 314 via one or more associated devices, e.g., a display device, speakers, an augmented or virtual reality headset, and so forth. In this way, a user of the client device 104 may view digital visual content via a display device that presents the selected 3D model as incorporated into the 3D digital stage. The user of the client device 104 may also listen to audio content output via speakers associated with the client device. This audio content may be included as part of a 3D stage, e.g., captured while a spherical video is captured, incorporated into the 3D stage data with sound processing functionality, and so forth. Accordingly, functionality of the 3D content manager module 124 enables browser-based incorporation of digital 3D models into digital 3D stages, limited modification of those models and stages, and generation of digital content that presents the models and stages. In the context of user interaction with the system to produce such digital content presentations, consider FIGS. 4-8.

Figure 4:
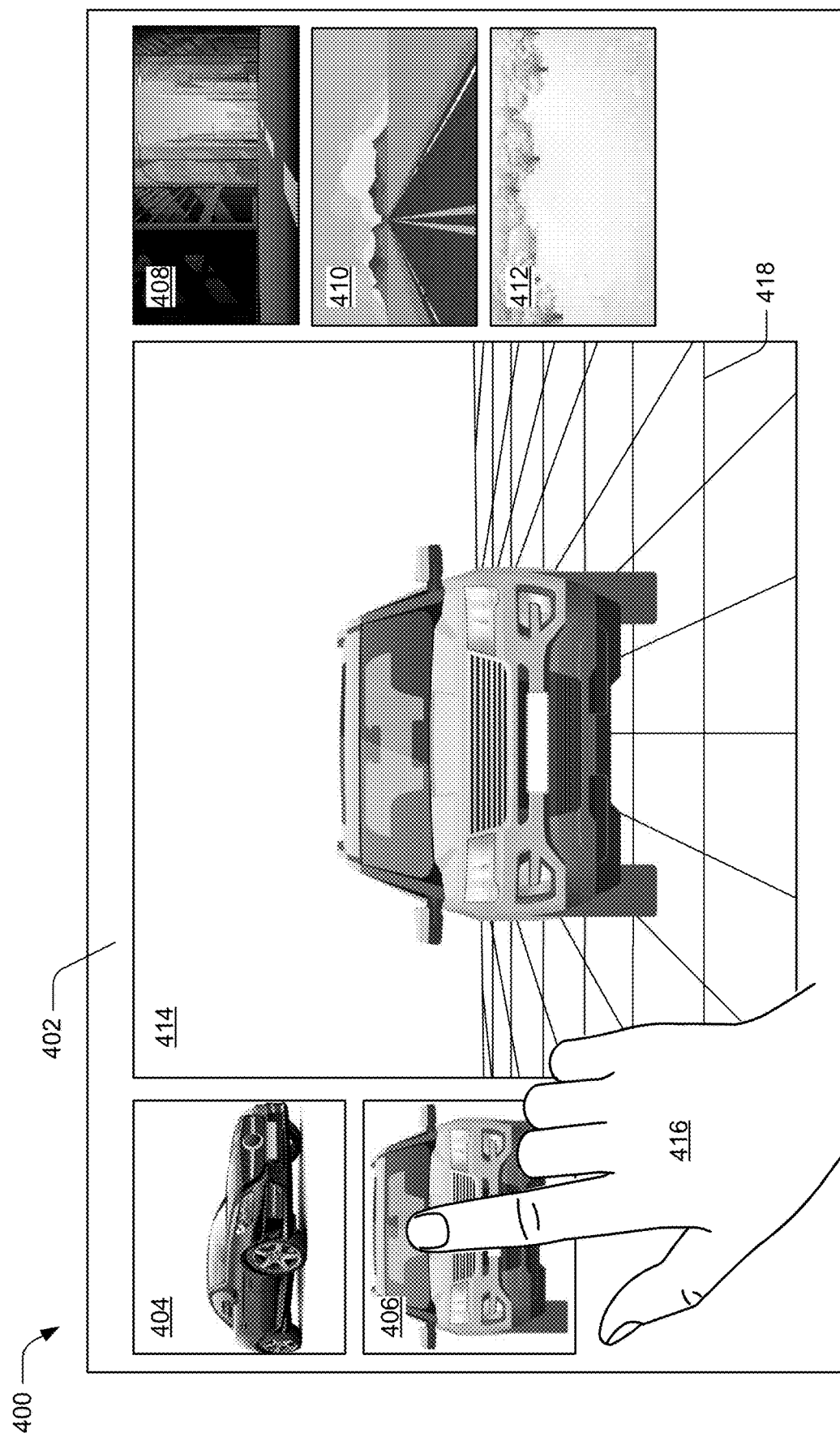
FIG. 4 depicts a user interface of an example implementation in which a digital 3D model is selected for incorporation into digital 3D stages.

FIG. 4 depicts a user interface of an example implementation 400 in which a digital 3D model is selected for incorporation into digital 3D stages. The illustrated example 400 includes displayed user interface 402, which includes representations of selectable 3D models 404, 406, representations of selectable 3D stages 408, 410, 412, and a current view window 414. This user interface 402 may be displayed via a display device associated with the client device 104. The illustrated example 400 also depicts a hand of a user 416.

In this example, the user 416 is depicted providing touch input to select the 3D model 406. Responsive to this touch input, the 3D model 406 is selected for incorporation with a 3D stage and is displayed via the current view window 414. The illustrated example 400 represents a scenario where a 3D stage has not yet been selected. Accordingly, the 3D model 406 is presented via the current view window 414 with wireframe 418, which represents a ground plane. When a 3D stage is selected, though, the current view window 414 may correspond to a viewpoint of one of the cameras of the selected 3D stage, as described by the stage's stage camera data 220.

Figure 5:
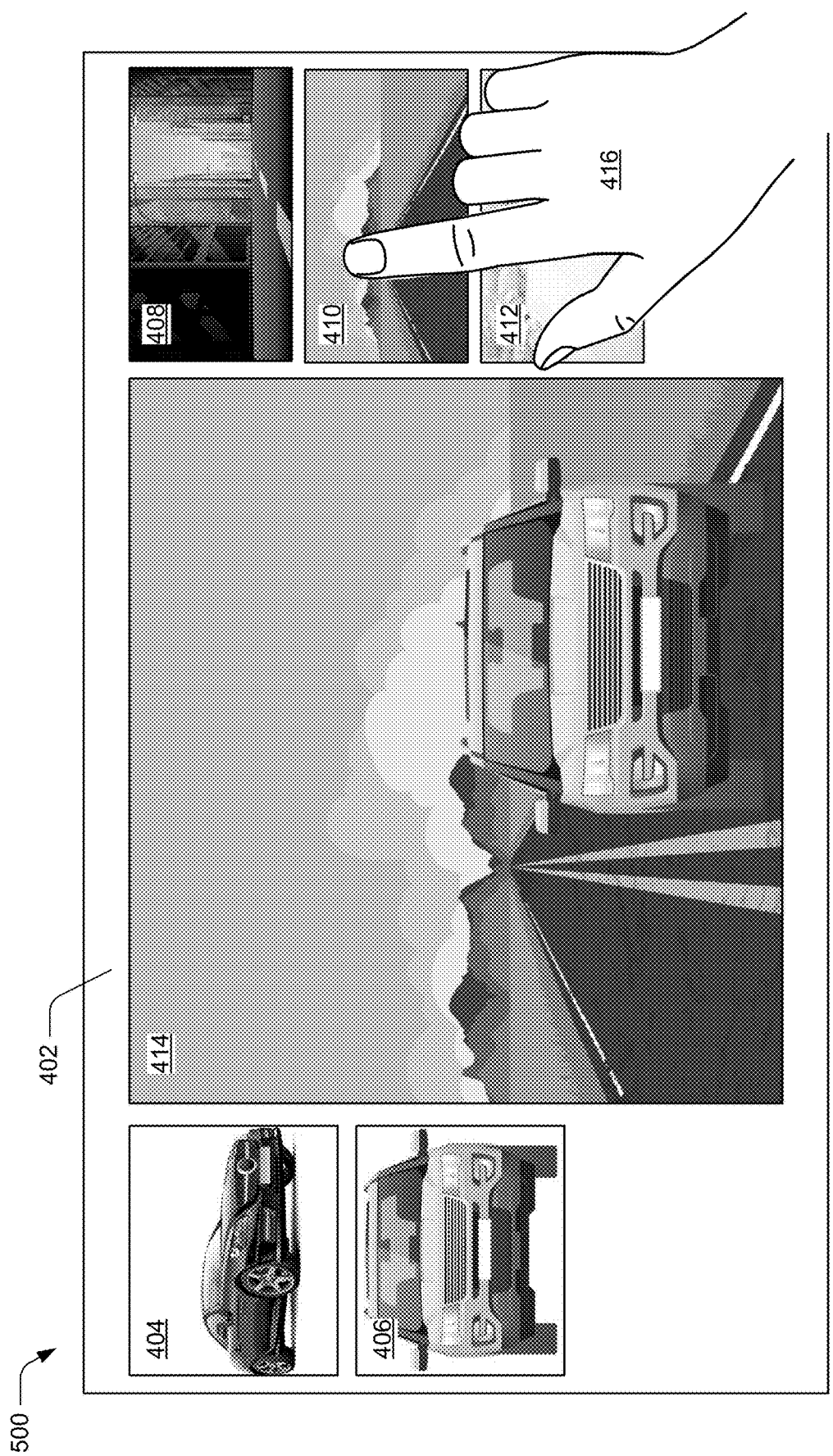
FIG. 5 depicts a user interface of an example implementation in which a digital 3D stage is selected for presentation of a selected 3D model.

FIG. 5 depicts a user interface of an example implementation 500 in which a digital 3D stage is selected for presentation of a selected 3D model.

In this example 500, the user 416 is depicted providing a second touch input to select the 3D stage 410—a desert stage. Responsive to this second touch input, the 3D stage 410 is selected for incorporating the selected 3D model 406. Accordingly, the current view window 414 displays the 3D stage 410 with the 3D model 406 incorporated, which is incorporated at one of the 3D stage 410's attachment points—as described by the model attachment point data 222. Moreover, the current view window 414 corresponds to one of the cameras of the 3D stage 410, as described by the 3D stage 410's stage camera data 220.

Although a 3D model has been selected first and a 3D stage selected second in the continuing example, it is to be appreciated that the described techniques are not to be limited to this order. Indeed, a user may select a 3D stage first and then one or more 3D models for incorporation into that 3D stage without departing from the spirit or scope of the described techniques. Additionally, a user may select a different 3D stage, e.g., the 3D stage 408, to "switch out" the stage used to present the selected 3D model 406.

Figure 6:
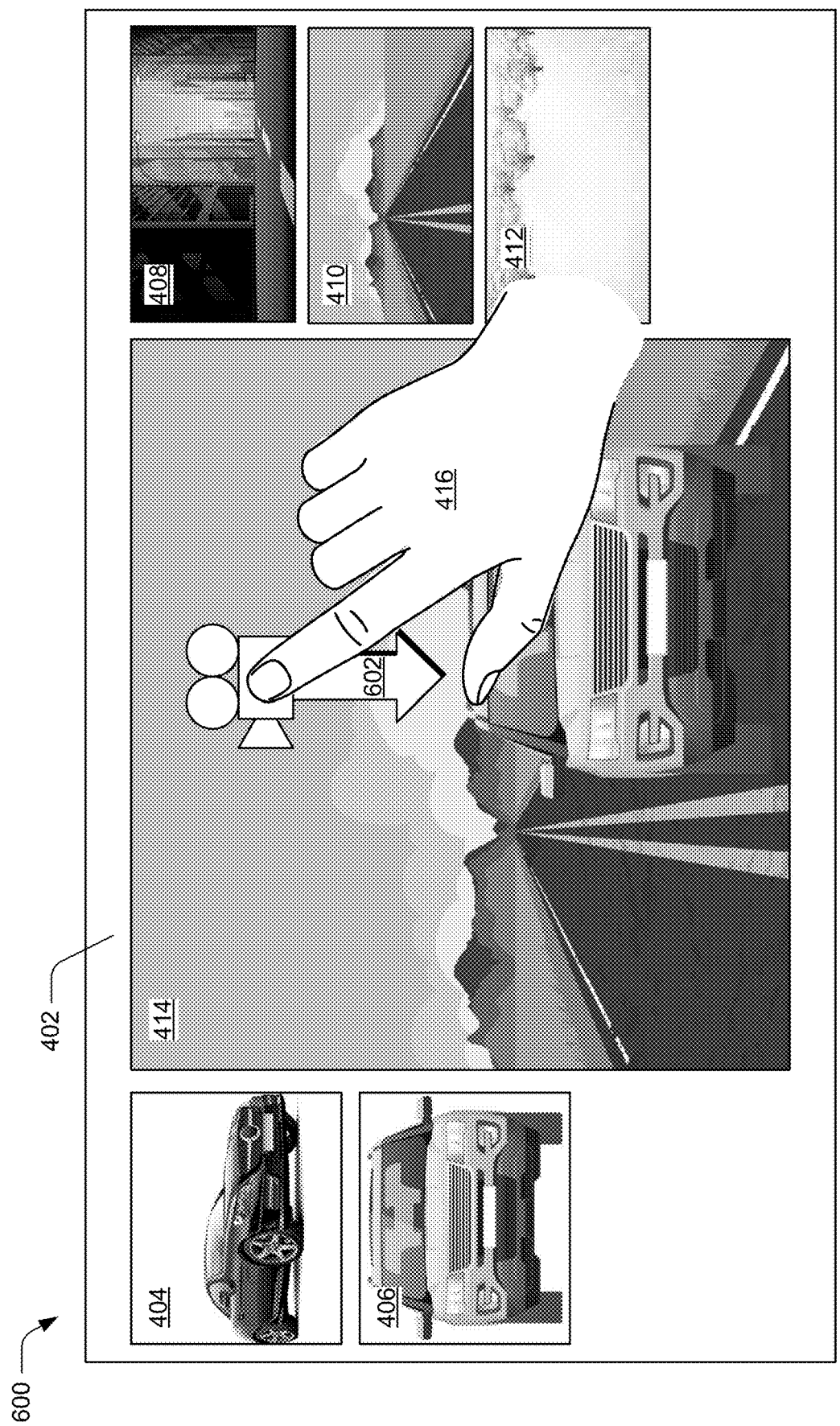
FIG. 6 depicts a user interface of an example implementation in which user input is received to change presentation of a 3D model from a first preset viewpoint of the digital 3D stage to a second preset viewpoint of the digital 3D stage.

FIG. 6 depicts a user interface of an example implementation 600 in which user input is received to change presentation of a 3D model from a first preset viewpoint of the digital 3D stage to a second preset viewpoint of the digital 3D stage. In this example 600, the user 416 is depicted providing user input 602 in relation to the current view window 414. Although depicted as a downward swiping input, the user input 602 may correspond to other types of inputs without departing from the spirit or scope of the described techniques, such as a menu input, selection of one or more controls (not shown), and so forth. Regardless of type, the user input 602 maps to functionality to change a presentation of the 3D model 406 as incorporated in the 3D stage 410. In particular, the user input 602 maps to functionality to change from a first preset viewpoint of the 3D stage 410 to a second preset viewpoint of the 3D stage 410. In the continuing example, the depicted viewpoint shown via the current view window 414 in FIGS. 5 and 6 corresponds to a first viewpoint and the depicted viewpoint shown via the current view window 414 in FIG. 7 corresponds to a second viewpoint.

Figure 7:
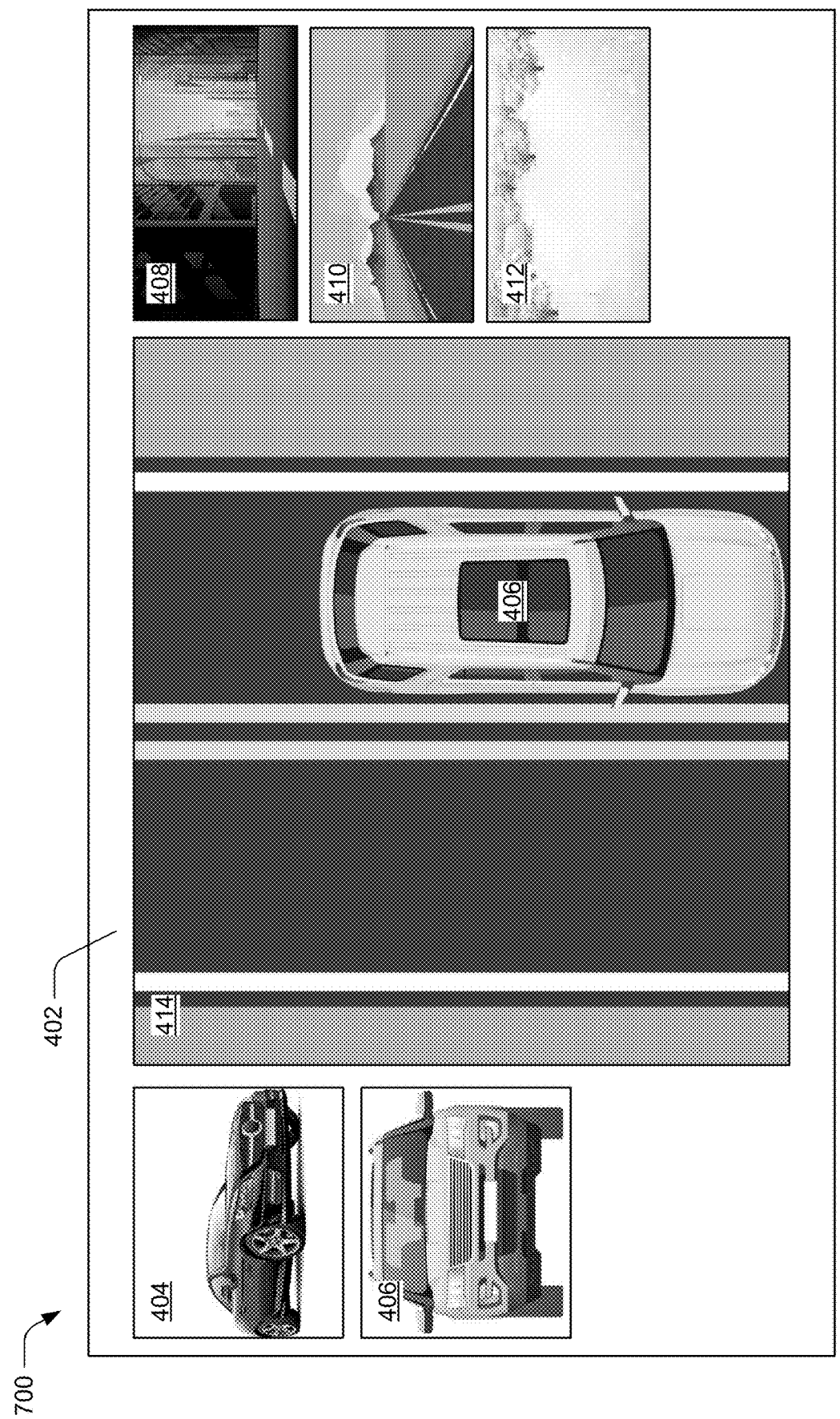
FIG. 7 depicts a user interface of an example implementation in which a 3D model is presented via the second preset viewpoint of the digital 3D stage.

FIG. 7 depicts a user interface of an example implementation 700 in which a 3D model is presented via the second preset viewpoint of the digital 3D stage. In this example 700, the selected 3D model 406 and the selected 3D stage 410 are presented in the current view window 414 via a second viewpoint of the 3D stage 410. This second viewpoint may correspond to a second camera of the 3D stage 410, as described by the 3D stage 410's stage camera data 220. Alternately, this second viewpoint may correspond to movement of a first camera of the 3D stage 410, e.g., as allowed by the stage camera data 220 and locked characteristic data 208. Indeed, different viewpoints may be achieved by switching between cameras defined for a 3D stage or by making allowed modifications to characteristics of a camera (as described above) that is defined for the 3D stage. Although two different viewpoints are shown in the illustrated examples, a scene may have more than two different viewpoints without departing from the spirit or scope of the described techniques.

Figure 8:
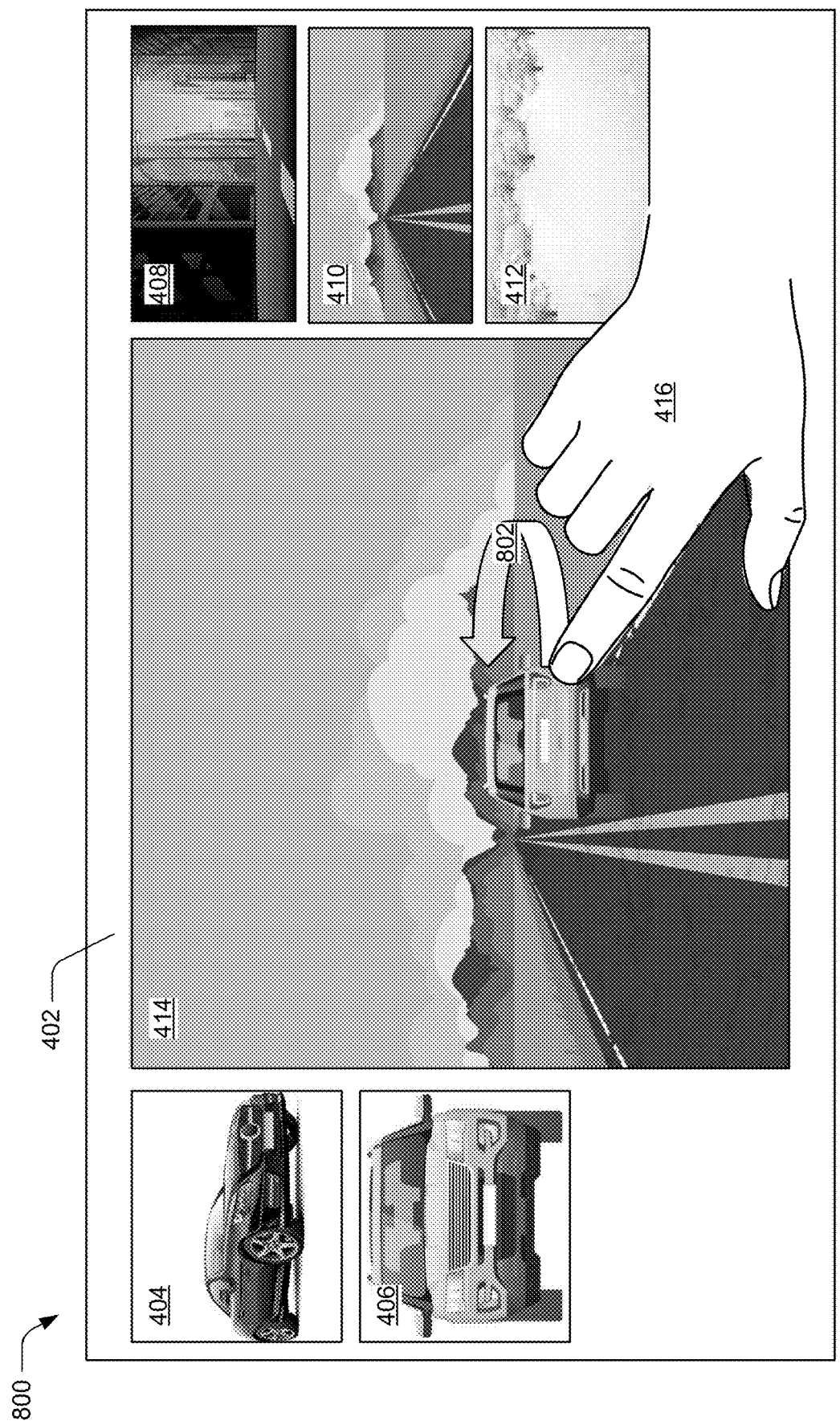
FIG. 8 depicts a user interface of an example implementation in which user input is received to change an orientation of the 3D model within the digital 3D stage.

FIG. 8 depicts a user interface of an example implementation 800 in which user input is received to change an orientation of the 3D model within the digital 3D stage. In this example 800, the user 416 is depicted providing user input 802 in relation to the 3D model 406 in the current view window 414. Although depicted as a curving input, to rotate the 3D model, the user input 802 may correspond to other types of inputs without departing from the spirit or scope of the techniques described herein. Additionally, different user inputs may be received via the user interface 402 to modify various characteristics of the incorporated 3D model 406. Such modifications include, but are not limited to, rotation along each of x-, y-, and z-axes, scaling the 3D model, changing a position of the 3D model 406 in relation to attachment points as allowed by the 3D stage 410's data, and so forth. Indeed, the depicted one-hundred and eighty degree rotation of the 3D model 406 (e.g., between FIG. 6 and FIG. 8) is but one example of how the 3D model 406 may be modified. The systems described herein are capable of making various other modifications to 3D models incorporated into 3D stages in accordance with the described techniques.

It is to be appreciated that although FIGS. 4-8 are depicted utilizing touch input to leverage the described functionality, other types of inputs may also or alternatively be used to leverage the described functionality, including stylus input, keyboard and/or mouse input, voice commands, gaze-based input, gesture input, and so forth.

Having discussed example details of the techniques for digital stages for presenting digital 3D models, consider now some example procedures to illustrate additional aspects of the techniques.

Example Procedures

This section describes example procedures of digital stages for presenting digital 3D models in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the 3D stage service system 122 of FIG. 1 or the client device 104 that makes use of the communication module 114.

Figure 9:
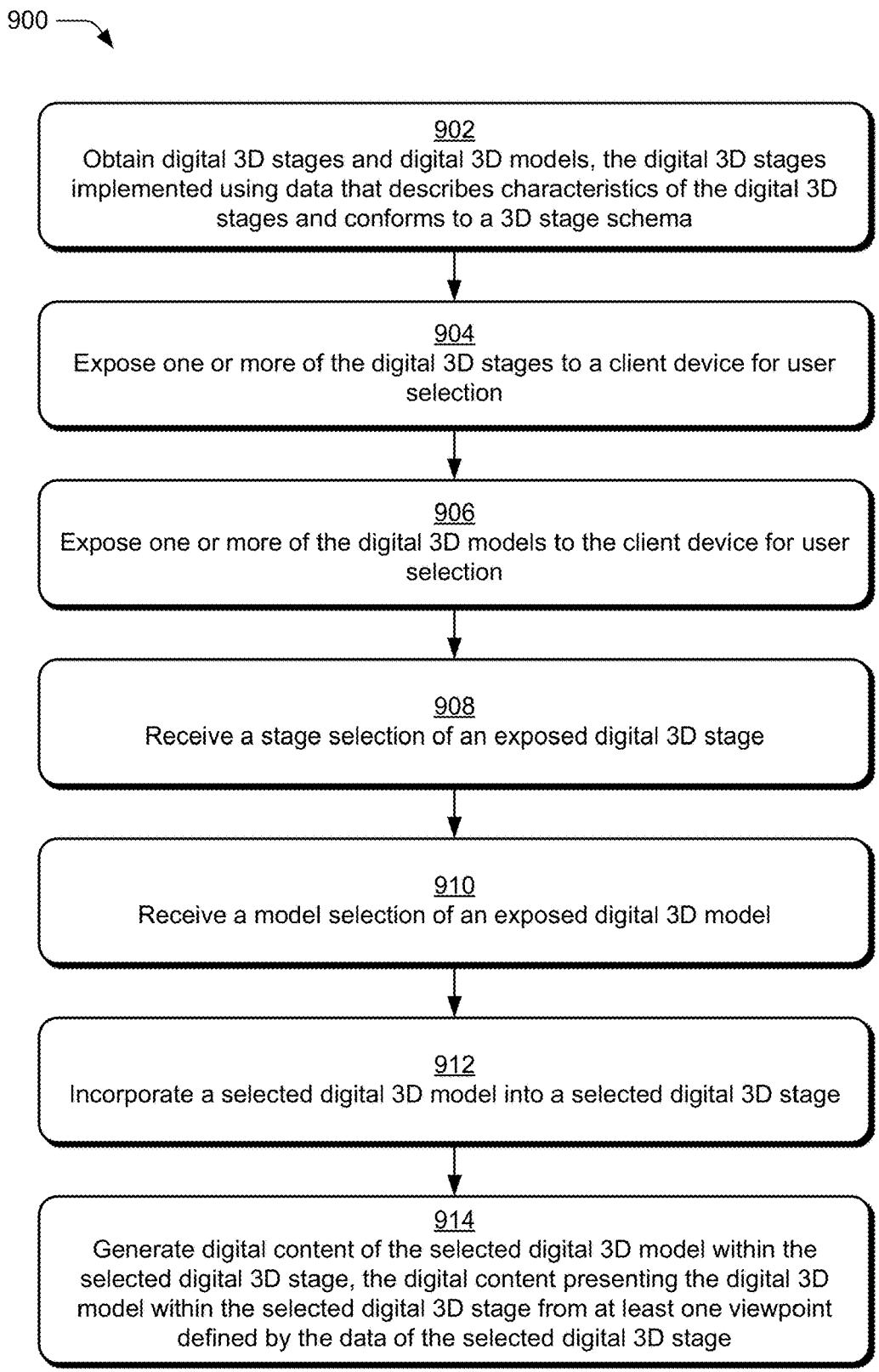
FIG. 9 depicts a procedure in an example implementation in which digital 3D stages and digital 3D models are exposed for selection by a client device user to incorporate a selected digital 3D model into a selected digital 3D stage.

FIG. 9 depicts an example procedure 900 in which digital 3D stages and digital 3D models are exposed for selection by a client device user to incorporate a selected digital 3D model into a selected digital 3D stage.

Digital 3D stages and models are obtained (block 902). In accordance with the principles discussed herein, the digital 3D stages are implemented using data that describes characteristics of the digital 3D stages and conforms to a 3D stage schema. By way of example, the 3D stage service system 122 receives digital 3D stages 108 from the sources 106. Alternately or in addition, the 3D stage service system 122 automatically generates digital 3D stages based on obtained digital content, such as received spherical images and videos. The 3D stage service system 122 also obtains digital 3D models, e.g., from the sources 106. The 3D stage service system 122 maintains obtained digital 3D stages and models in the storage 128 as the stages 130 and the models 132 of the maintained 3D digital content 126. In order to provide the functionality described herein, the digital 3D stages, as obtained, generated, and/or converted, are configured according to the digital 3D stage schema 202.

Digital 3D stages are exposed to a client device for user selection (block 904). By way of example, the 3D stage service system 122 exposes one or more of the stages 130 to the client device 104 for user selection. In the context of FIGS. 4-8, for instance, the 3D stage service system 122 exposes the 3D stages 408, 410, 412 to the client device 104 for selection by a user, e.g., being selectable based on user input received in relation to the representations of those stages displayed via the user interface 402.

Digital 3D models are exposed to the client device for user selection (block 906). By way of example, the 3D stage service system 122 exposes one or more of the models 132 to the client device 104 for user selection. In the context of FIGS. 4-8, for instance, the 3D stage service system 122 exposes the 3D models 404, 406 to the client device 104 for selection by a user, e.g., being selectable based on user input received in relation to the representations of those models displayed via the user interface 402.

A stage selection is received of an exposed digital 3D stage (block 908). By way of example, the 3D stage service system 122 receives the stage selection data 302, which may be indicative of user input received via the user interface 402 to select one of the representations of the selectable 3D stages 408, 410, 412. A model selection is received of an exposed digital 3D model (block 910). By way of example, the 3D stage service system 122 receives model selection data 304, which may be indicative of user input received via the user interface 402 to select one of the representations of the selectable 3D models 404, 406.

A selected digital 3D model is incorporated into a selected digital 3D stage (block 912). By way of example, the 3D stage service system 122 incorporates the 3D model 406 into the 3D stage 410, e.g., at a model attachment point of the 3D stage 410 as indicated by the 3D stage 410's model attachment point data 222. Alternately or in addition, the client device 104 incorporates the 3D model 406 into the 3D stage 410. In the context of FIG. 1, this involves the client device 104 incorporating the selected 3D model 120 into the selected digital 3D stage 116, which correspond to the 3D model 406 and 3D stage 410, respectively. In particular, the client device 104 incorporates the selected 3D model 120 into the selected digital 3D stage 116 at one of the 3D model attachment points 118, as indicated by the selected digital 3D stage 116's model attachment point data 222.

Digital content corresponding to a presentation of the selected digital 3D model within the selected digital 3D stage is generated (block 914). In accordance with the principles discussed herein, the digital content presents the digital 3D model within the selected digital 3D stage from at least one viewpoint defined by the data of the selected digital 3D stage. By way of example, the 3D stage service system 122 generates the rendered digital content 314 to present the 3D model 406 as incorporated into the 3D stage 410. Examples of this digital content include, but are not limited to, images (with or without audio), videos (with or without audio), AR/VR content (with or without audio), and so forth. This digital content presents the 3D model 406 as incorporated into the 3D stage 410 via at least one viewpoint of the 3D stage 410, which is indicated by the 3D stage 410's stage camera data 220.

Figure 10:
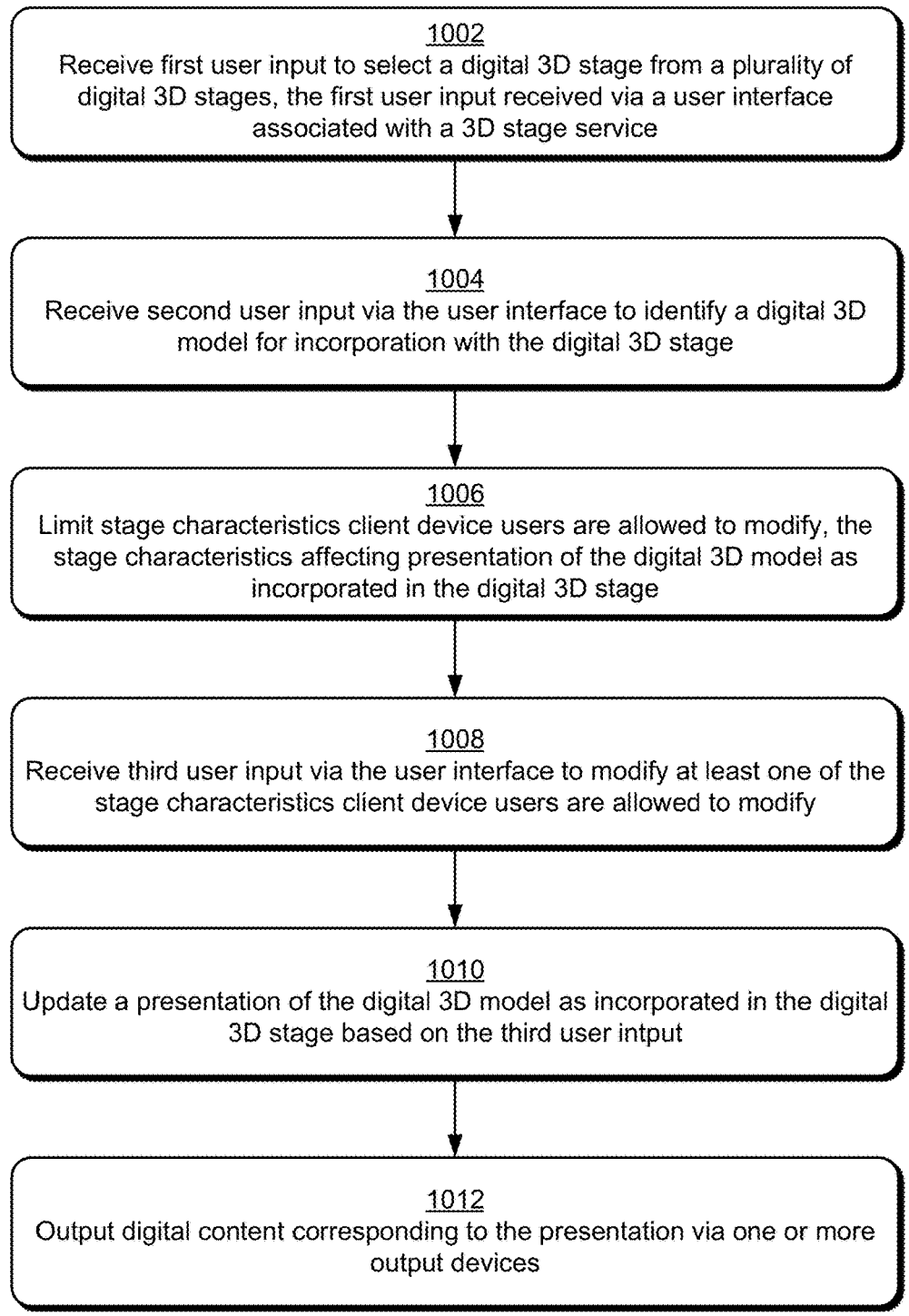
FIG. 10 depicts a procedure in an example implementation in which user inputs are received to select digital 3D stages and models and also to modify limited stage characteristics in connection with presenting a digital 3D model incorporated in a digital 3D stage.

FIG. 10 depicts an example procedure 1000 in which user inputs are received to select digital 3D stages and models and also to modify limited stage characteristics in connection with presenting a digital 3D model incorporated in a digital 3D stage.

First user input is received to select a digital 3D stage from a plurality of digital 3D stages (block 1002). In accordance with the principles discussed herein, the first user input is received via a user interface associated with a 3D stage service. By way of example, the client device 104 receives the touch-based user input depicted in FIG. 5 via the user interface 402 to select the 3D stage 410. Second user input is received via the user interface to identify a digital 3D model for incorporation into the digital 3D stage (block 1004). By way of example, the client device 104 receives the touch-based user input depicted in FIG. 4 via the user interface 402 to select the 3D model 406.

Stage characteristics client device users are allowed to modify are limited (block 1006). In accordance with the principles discussed herein, these stage characteristics affect presentation of the digital 3D model as incorporated in the digital 3D stage. By way of example, data of the 3D stage 410, which is configured according to the digital 3D stage schema, limits characteristics of the 3D stage 410 a user of the client device 104 is allowed to modify. Characteristics of the 3D stage 410's cameras, that the user of the client device 104 is allowed to modify, may be limited as indicated by the stage camera data 220 and the locked characteristic data 208. This contrasts with the characteristics a developer of the 3D stage 410 can modify. By way of example, a developer of the 3D stage 410 may, through functionality of a stage-development application, be capable of adding or removing any number of cameras, introducing cameras at any position of the stage, defining camera properties (e.g., angle of view, focal length, and so on). However, users of client devices that receive digital 3D stages, configured according to the described techniques, are limited in the modifications they can make to these stages relative to stage developers. These limitations make incorporation of digital 3D models into 3D environments easier for end users than conventional techniques because the end users do not have to program visually pleasing views of an incorporated model. Instead, these end users can merely select from views already programmed as part of the stage and determined to be visually pleasing.

Third user input is received via the user interface to modify at least one of the stage characteristics client device users are allowed to modify (block 1008). By way of example, the client device 104 receives the user input 602 to change a presentation of the 3D model 406 as incorporated in the 3D stage 410. A presentation of the digital 3D model, as incorporated in the digital 3D stage, is updated based on the third user input (block 1010). By way of example, the presentation in the current view window 414 of the 3D model 406 as incorporated in the 3D stage 410 is changed from a first view as depicted in FIG. 6 to a different, second view as depicted in FIG. 7 based on the user input 602.

Digital content corresponding to the presentation is output via one or more output devices (block 1012). By way of example, a digital image, digital video, and/or AR/VR content corresponding to the presentation is output via one or more output devices associated with the client device 104, such as a display device, a mobile device communicably coupled to the client device 104, speakers, a virtual reality headset, and so forth.

Having described example procedures in accordance with one or more implementations, consider now an example system and device that can be utilized to implement the various techniques described herein.

Example System and Device

Figure 11:
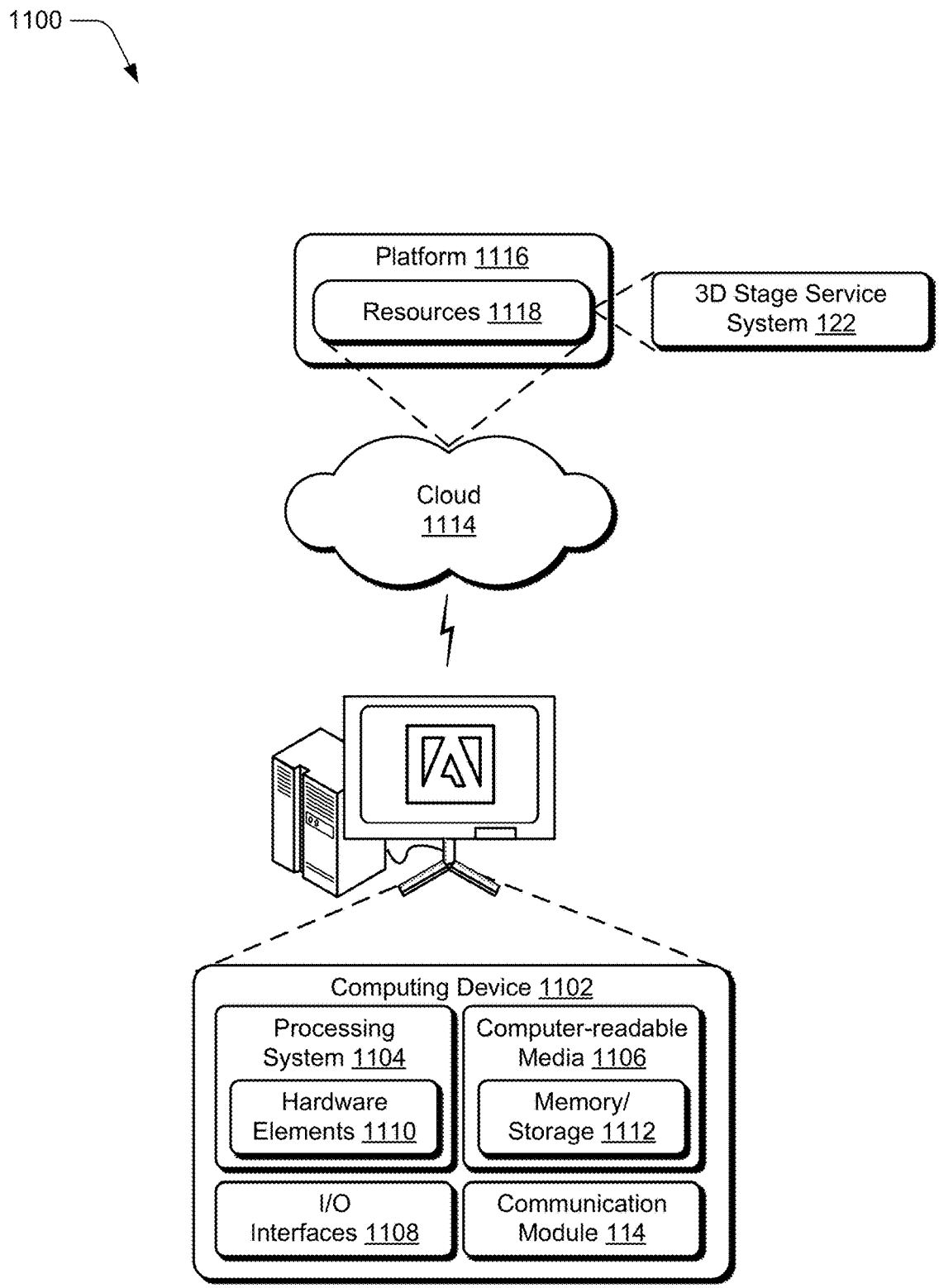
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the communication module 114 and the 3D stage service system 122. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
controlling, by at least one computing device, configuration of a digital three-dimensional (3D) stage received by a stock service and received from a source of stock content that corresponds to a social networking user based on conforming the digital 3D stage with a 3D stage schema;
storing, by the at least one computing device, the digital 3D stage using storage of the stock service;
exposing, by the at least one computing device, the digital 3D stage for provision to client devices via a user interface of the stock service; and
responsive to obtaining a selection of the digital 3D stage from at least one of the client devices, providing, by the at least one computing device, the digital 3D stage via the stock service to the at least one client device.

2. The method as described in claim 1, wherein the digital 3D stage comprises a hand in relation to which one or more digital 3D models can be incorporated.

3. The method as described in claim 2, wherein the one or more digital 3D models include at least one of a mobile device model, a clothing model, or an accessory model.

4. The method as described in claim 1, wherein the digital 3D stage comprises an auto-dealer showroom in relation to which one or more digital 3D models can be incorporated.

5. The method as described in claim 4, wherein the one or more digital 3D models include at least one automobile model.

6. The method as described in claim 1, wherein the source of stock content that corresponds to the social networking user corresponds to a user associated with creating the digital 3D stage in accordance with the 3D stage schema.

7. The method as described in claim 1, further comprising receiving at least one digital 3D model from the source of stock content that corresponds to the social networking user, the digital 3D stage configured to incorporate the at least one digital 3D model.

8. The method as described in claim 1, further comprising, responsive to obtaining a selection of a digital 3D model from the at least one client device, providing the digital 3D model via the stock service to the at least one client device for incorporation in the digital 3D stage.

9. The method as described in claim 1, wherein the digital 3D stage is exposed for provision to client devices of subscribers of the stock service, the subscribers having subscriptions with the stock service controlled by an agreement between users of the client devices and the stock service.

10. The method as described in claim 1, wherein the digital 3D stage is exposed via a user interface of a company and a user of the client device is associated with the company.

11. A system comprising:
a three-dimensional (3D) content manager module implemented at least partially in hardware of at least one computing device to:
control configuration of a digital 3D stage received by a stock service and received from a source of stock content that corresponds to a social networking user based on conforming the digital 3D stage with a 3D stage schema;
store the digital 3D stage using storage of the stock service;

expose the digital 3D stage for provision to client devices via a user interface of the stock service; and provide the digital 3D stage via the stock service to at least one of the client devices responsive to a selection of the digital 3D stage obtained from the at least one client device.

12. The system as described in claim 11, wherein the digital 3D stage comprises a hand in relation to which one or more digital 3D models can be incorporated.

13. The system as described in claim 12, wherein the one or more digital 3D models include at least one of a mobile device model, a clothing model, or an accessory model.

14. The system as described in claim 11, wherein the digital 3D stage comprises an auto-dealer showroom in relation to which one or more digital 3D models can be incorporated.

15. The system as described in claim 14, wherein the one or more digital 3D models include at least one automobile model.

16. The system as described in claim 11, wherein the digital 3D stage is exposed via a user interface of a company and a user of the client device is associated with the company.

17. A method comprising:
controlling, by at least one computing device, configuration of a digital three-dimensional (3D) stage of a hand that is received by a network-based service and received from a source of digital stages based on conforming the digital 3D stage with a 3D stage schema;

exposing, by the at least one computing device, the digital 3D stage of the hand to a client device for selection;

receiving, by the at least one computing device and from the client device, a stage selection of the digital 3D stage of the hand; and incorporating, by the at least one computing device, a digital 3D model into the digital 3D stage of the hand based on at least one rule of the 3D stage schema.

18. The method as described in claim 17, wherein the digital 3D model comprises a mobile device model, a clothing model, or an accessory model.

19. The method as described in claim 17, further comprising receiving a model selection of the digital 3D model.

20. The method as described in claim 17, wherein the digital 3D stage of the hand is exposed via a user interface of a company and a user of the client device is associated with the company.

* * * * *